United States Patent
Kling et al.

(10) Patent No.: US 10,119,423 B2
(45) Date of Patent: Nov. 6, 2018

(54) GAS TURBINE ENGINE FAN SPACER PLATFORM ATTACHMENTS

(71) Applicant: United Technologies Corporation, Hartford, CT (US)

(72) Inventors: Colin J. Kling, Middletown, CT (US); Charles W. Brown, East Hampton, CT (US); Christopher M. Quinn, Middletown, CT (US); Shelton O. Duelm, Wethersfield, CT (US); Peter V. Tomeo, Middletown, CT (US); Corey L. Hubbert, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 315 days.

(21) Appl. No.: 14/426,252

(22) PCT Filed: Sep. 17, 2013

(86) PCT No.: PCT/US2013/060085
§ 371 (c)(1),
(2) Date: Mar. 5, 2015

(87) PCT Pub. No.: WO2014/088673
PCT Pub. Date: Jun. 12, 2014

(65) Prior Publication Data
US 2015/0218966 A1     Aug. 6, 2015

Related U.S. Application Data

(60) Provisional application No. 61/775,209, filed on Mar. 8, 2013, provisional application No. 61/703,390, filed on Sep. 20, 2012.

(51) Int. Cl.
*F01D 25/28*     (2006.01)
*F01D 25/24*     (2006.01)
(Continued)

(52) U.S. Cl.
CPC .......... *F01D 25/28* (2013.01); *F01D 11/008* (2013.01); *F01D 25/24* (2013.01); *F02C 3/10* (2013.01);
(Continued)

(58) Field of Classification Search
CPC ........ F01D 5/30; F01D 5/3007; F01D 5/3015; F01D 5/3023; F01D 5/3053;
(Continued)

(56) References Cited

U.S. PATENT DOCUMENTS 3,112,865 A * 12/1963 Gisslen ................... F01D 5/022
                                                                                       415/79
3,990,814 A      11/1976 Leone
(Continued)

FOREIGN PATENT DOCUMENTS

EP        1167692        1/2002

OTHER PUBLICATIONS

International Preliminary Report on Patentability for International Application No. PCT/US2013/060085 dated Apr. 2, 2015.
(Continued)

*Primary Examiner* — Richard Edgar
*Assistant Examiner* — Alexander White
(74) *Attorney, Agent, or Firm* — Carlson, Gaskey & Olds, P.C.

(57) ABSTRACT

A fan hub assembly for a gas turbine engine includes a fan hub that is configured to rotate about an axis. The fan hub has an axially extending aperture and a platform. A fastener is received in the aperture in a slip fit relationship to secure the platform to the fan hub.

11 Claims, 4 Drawing Sheets

(51) Int. Cl.
*F02C 3/10* (2006.01)
*F01D 11/00* (2006.01)

(52) U.S. Cl.
CPC .......... *Y02T 50/671* (2013.01); *Y10T 29/4932* (2015.01)

(58) Field of Classification Search
CPC .......... F01D 5/3069; F01D 5/32; F01D 5/326; F01D 11/008; F01D 25/24; F01D 25/28; F02C 3/10; F04D 29/321; F04D 29/322; F04D 29/325; F04D 29/329; F04D 29/34; F04D 29/646; F05D 2220/36
See application file for complete search history.

(56) References Cited

U.S. PATENT DOCUMENTS

| | | | |
|---|---|---|---|
| 4,183,720 A | 1/1980 | Brantley | |
| 4,400,137 A * | 8/1983 | Miller | F01D 5/326 29/889.1 |
| 4,580,945 A | 4/1986 | Miller | |
| 5,820,338 A | 10/1998 | Kasprow et al. | |
| 5,935,360 A | 8/1999 | Griggs | |
| 5,957,658 A | 9/1999 | Kasprow et al. | |
| 6,146,099 A | 11/2000 | Zipps et al. | |
| 6,217,283 B1 | 4/2001 | Ravenhall et al. | |
| 6,290,466 B1 | 9/2001 | Ravenhall et al. | |
| 6,332,490 B1 | 12/2001 | Griggs et al. | |
| 6,447,250 B1 | 9/2002 | Corrigan et al. | |
| 6,447,255 B1 * | 9/2002 | Bagnall | F01D 5/066 277/626 |
| 6,634,863 B1 * | 10/2003 | Forrester | F01D 5/06 416/193 A |
| 6,736,602 B2 | 5/2004 | Carney | |
| 6,991,428 B2 | 1/2006 | Crane | |
| 7,163,375 B2 * | 1/2007 | Queriault | F01D 11/008 416/193 A |
| 7,553,125 B2 | 6/2009 | Audie et al. | |
| 8,070,438 B2 | 12/2011 | Evans | |
| 2005/0063826 A1 | 3/2005 | Queriault | |
| 2008/0226458 A1 | 11/2008 | Pierrot | |
| 2011/0038731 A1 * | 2/2011 | Evans | F01D 5/06 416/220 R |
| 2011/0085914 A1 * | 4/2011 | Breakwell | F01D 11/008 416/248 |
| 2013/0309073 A1 | 11/2013 | Brown | |
| 2013/0323073 A1 | 12/2013 | McCaffrey et al. | |
| 2014/0064935 A1 | 3/2014 | Alarcon | |
| 2014/0169979 A1 | 6/2014 | Alarcon et al. | |

OTHER PUBLICATIONS

International Search Report for PCT Application No. PCT/US2013/060085 dated Jul. 2, 2014.

* cited by examiner

GAS TURBINE ENGINE FAN SPACER PLATFORM ATTACHMENTS

This application is a United States National Phase of PCT Application No. PCT/US2013/060085 filed on Sep. 17, 2013 which claims priority to U.S. Provisional Application No. 61/775,209 filed Mar. 8, 2013 and U.S. Provisional Application No. 61/703,390 filed Sep. 20, 2012.

BACKGROUND

This disclosure relates to platform attachments in a fan section of a gas turbine engine and methods of securing the platforms to a fan hub.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

One type of gas turbine engine includes a fan drive gear system having a fan section with relatively large fan blades. One type of fan section utilizes platforms between adjacent fan blades that are supported by a fan hub to which the fan blades are also secured. Typically, the platforms include seals adhered to platform walls adjacent to the fan blades' exterior airfoil surface. The seals obstruct a gap between the platform and the fan blade to provide a more aerodynamic inner flow path surface by eliminating leakage at the fan blade-platform interface.

One type of platform configuration provides platforms arranged on either side of and integral with each fan blade. Another type of platform is secured the fan hub by a single pin that devises in the platform that cooperate with corresponding lugs in fan hub.

SUMMARY

In one exemplary embodiment, a fan hub assembly for a gas turbine engine includes a fan hub that is configured to rotate about an axis. The fan hub has an axially extending aperture and a platform. A fastener is received in the aperture in a slip fit relationship to secure the platform to the fan hub.

In a further embodiment of the above the fan hub includes forward and aft lugs. The fastener corresponds to a first fastener which is received in the forward lug. A second fastener which is received in the aft lug in a slip fit relationship.

In a further embodiment of any of the above, the forward lug extends radially inward from the fan hub, and the aft lug extends radially outward from the fan hub.

In a further embodiment of any of the above, a spinner is secured to the fan hub to axially retain the platform against the forward lug.

In a further embodiment of any of the above, the fastener is a pin.

In a further embodiment of any of the above, the pin is integral within the platform.

In a further embodiment of any of the above, the pin extends aftward from the platform.

In a further embodiment of any of the above, the pin is bonded to the platform.

In a further embodiment of any of the above, a second fastener is oriented in a radial direction and secures the platform to the fan hub.

In a further embodiment of any of the above, the platform provides an inner flow surface with a hole aligned with the second fastener.

In a further embodiment of any of the above, fan blades are secured to the fan hub. The platform is secured circumferentially between adjacent fan blades.

In another exemplary embodiment, a method of assembling a fan hub includes axially receiving a fastener in a slip fit relationship with respect to an aperture in a fan hub. The fastener secures the platform to the fan hub.

In a further embodiment of any of the above, the axially receiving step includes moving the platform and fastener together as a platform assembly in a radial direction toward the fan hub, and sliding the platform in an axial direction to insert the fastener into the aperture.

In a further embodiment of any of the above, the axially receiving step includes threading the fastener into the platform.

In a further embodiment of any of the above, the method of assembling a fan hub includes the step of inserting a second fastener in a radial direction through a hole in a platform inner flow surface, and threading the second fastener into the fan hub.

In another exemplary embodiment, a fan hub assembly for a gas turbine engine includes a fan hub configured to rotate about an axis. The fan hub includes a radially extending aperture. A platform provides an inner flow surface that has a hole. A fastener is aligned with the hole and is received in the aperture to secure the platform to the fan hub.

In a further embodiment of any of the above, the fan hub includes an axially extending aperture that receives a second fastener which secures the platform to the fan hub.

In a further embodiment of any of the above, the second fastener is threaded to the platform and in a slip fit relationship with respect to the axially extending aperture.

BRIEF DESCRIPTION OF THE DRAWINGS

The disclosure can be further understood by reference to the following detailed description when considered in connection with the accompanying drawings wherein.

DETAILED DESCRIPTION

Figure 1:
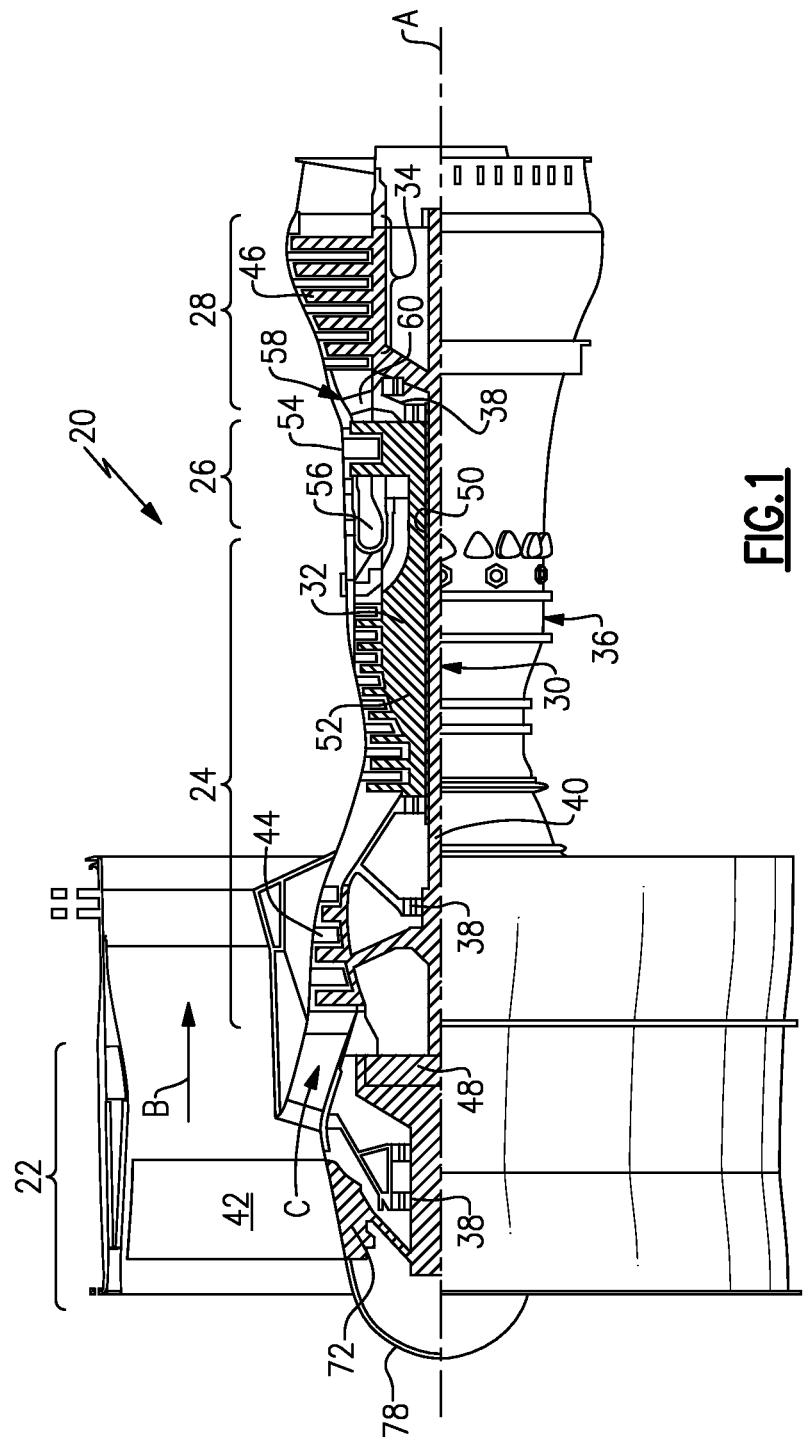
FIG. 1 is a schematic view of an example gas turbine engine incorporating the disclosed airfoil.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram}\,^\circ\text{R})/(518.7^\circ\text{R})]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
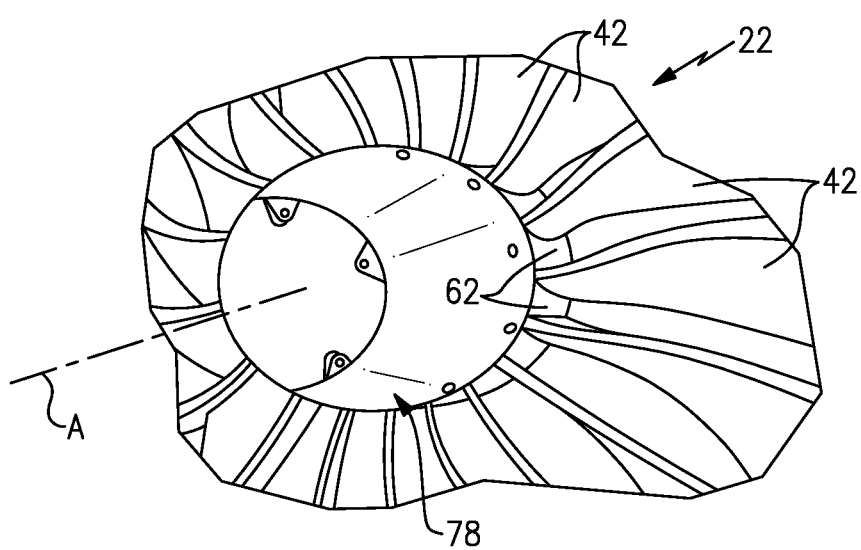
FIG. 2 is a perspective view of a portion of a fan section of the engine shown in FIG. 1.

FIG. 2 illustrates the fan section 22 with discrete platforms 62 circumferentially interleaved between the fan blades 42. A spinner 78 is provided forward of the fan blades 42 and platforms 62 to provide an aerodynamic inner flow path 63 (FIGS. 3 and 4) into the fan section 22. The spinner 78 may be one-piece or multiple pieces and may be of any suitable shape.

Figure 3:
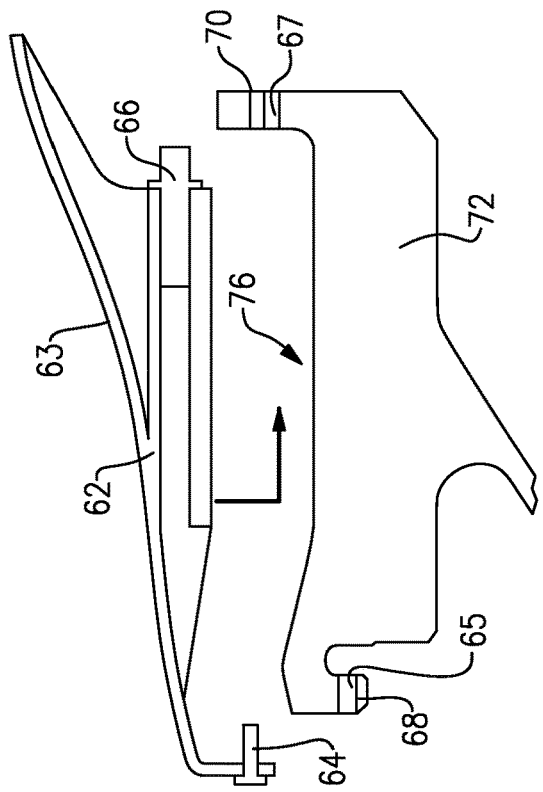
FIG. 3 is a cross-sectional view of one example platform attachment arrangement prior to attachment to a fan hub.
Figure 4:
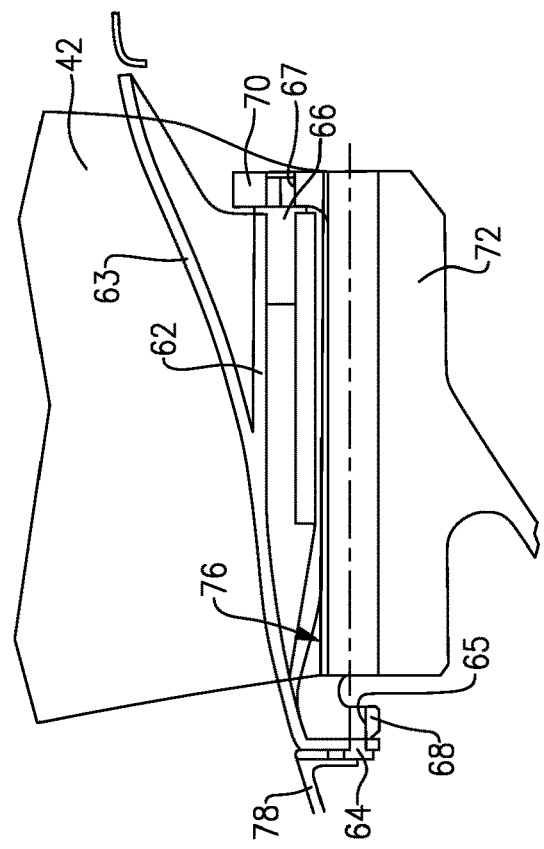
FIG. 4 is a cross-sectional view of the platform attachment arrangement shown in FIG. 3 subsequent to attachment to the fan hub.
Figure 5:
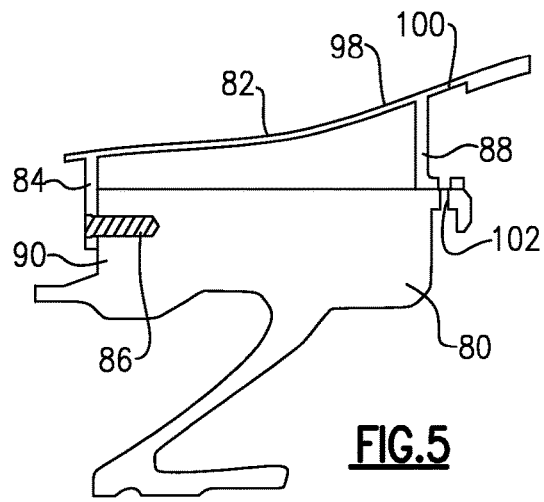
FIG. 5 is a cross-sectional view another example platform attachment arrangement secured to a fan hub.
Figure 6:
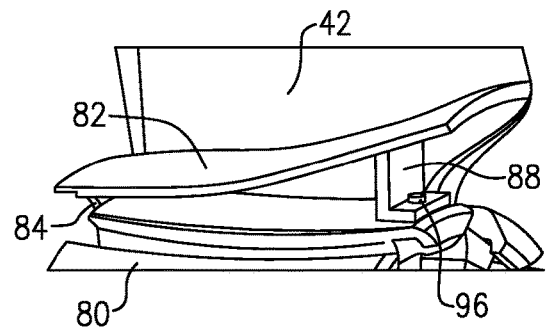
FIG. 6 is a perspective view of a platform attachment arrangement shown in FIG. 5.
Figure 7:
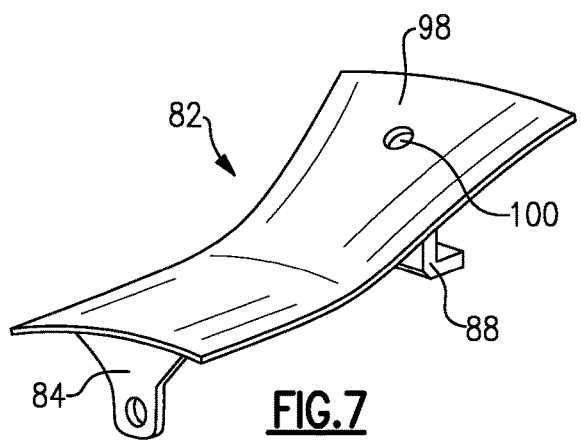
FIG. 7 is a perspective view of a platform shown in FIG. 6.
Figure 8:
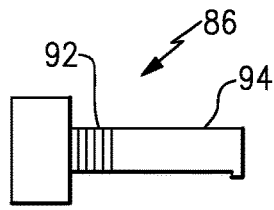
FIG. 8 is a side view of an example fastener used to secure the platform of FIGS. 5-7 to the fan hub.

Referring to FIGS. 3 and 4, each platform 62 contains axially oriented fasteners 64, 66, which are received in a slip fit relationship in corresponding apertures 65, 67 in the fan hub 72. "Slip fit relationship" means the fasteners are axially slidable with respect to its aperture and not in threaded engagement at the relatively slidable surfaces. The apertures 65, 67 are respectively provided in forward and aft lug 68, 70. In the example, the forward lug 68 extends radially inwardly from the fan hub 72, and the aft hub 70 extends radially outwardly from the fan hub 72.

In the example, the fasteners 64, 66 are provided by two bonded pins, although the pins may be integrally formed with the platform 62, for example, by molding. In the example, the pins are cylindrical in shape. The pins are aft facing in the example.

Typically the fan blades 42 are secured to the fan hub 72 prior to assembly of the platforms 62 onto the fan hub 72. During assembly, the platform 62 and fasteners 64, 66, which form a platform assembly, are moved radially inward toward the fan hub 72 and translated aft to insert the fasteners 64, 66 into the apertures of the lugs 68, 70. In this manner, the platform 62 is radially constrained with respect to the fan hub 72. The hub lugs 68, 70 provide axial retention for the platform 62. A spinner 78 is then secured to the fan hub 72 providing forward retention of the platform 62.

The fan hub 72 can contain trenches 76, or axially extending circumferentially spaced grooves, that allow the platform 62 to be inserted further radially and still provide enough space between the flow path and the fan hub 72 for attachment pins 64, 66 and hub lugs 68, 70. The trenches 76 include removal of non-structural material in the rim of the fan hub 72 to provide additional radial space while still maintaining enough structural material to support the fan blades.

The trenches 76 provide the additional benefit of a significant weight reduction of the fan hub 72. The low-profile fan spacer attachment scheme that can be utilized as a successful method to attach fan spacers to engines with small fan diameters. This allows the inner flow path area to be maximized with less of a weight impact. If a full through pin was required, the inner flow path surface would need to be brought radially outboard to provide enough space between the flow path and hub for the pin and lugs adding weight to the hub, fan blades and fan case and increasing the fan diameter.

Integral fasteners 64, 66 allow them to be located only in attachment regions, acting as a weight reduction over that of a single full length pin. The trenches 76 allow for an additional weight reduction of non-structural material from the hub dead rim. Since the fasteners 64, 66 are bonded in it lessens engine piece part count and is one less part that needs to be tracked at the engine assembly level.

Referring to FIGS. 5-8, another example platform 82 includes a forward flange 84 that accepts an axial bolt/pin 86 for radial retention to the fan hub 80. The aft end of the platform 82 has an axial flange 88 that allows the platform 82 to bolt radially to the fan hub 80 with an aft bolt 96 and provide radial and axial retention. The platform 82 can be installed/uninstalled in a solely radial direction. During assembly, the bolt 96 is inserted through a hole 100 in the inner flow surface 98 of the platform 82. The hole 100 is aligned with a radially extending threaded aperture 102 in the fan hub 80.

The forward flange 84 extends over a hub forward face 90 and accepts a bolt/pin 86. The bolt/pin 86 includes threads 92 near the head for retention to the platform 82 but the portion which extends into the fan hub 80 is a smooth cylindrical surface 94. The portion with the cylindrical surface 94 is received in a slip fit relationship within an aperture in the forward flange 84. This eliminates the stress concentration the fan hub 80 would otherwise experience if it had a threaded hole to accept a bolt.

The disclosed example provides for the removal of the lugs on the fan hub, thereby decreasing the fan hub forging envelope. This serves as a cost savings as well as a slight weight reduction. The full length retention pin is no longer necessary, reducing part count. The platform can be installed entirely radially, requiring no axial translation to be put into position. Axial translation presents a challenge given state of the art fan blade geometry as well as sealing requirements to the fan blade.

Although an example embodiment has been disclosed, a worker of ordinary skill in this art would recognize that certain modifications would come within the scope of this disclosure.

What is claimed is:

1. A fan hub assembly for a gas turbine engine comprising:
   a fan hub that includes forward and aft lugs and is configured to rotate about an axis, wherein the forward and aft lugs respectively include an axially extending first and second aperture;
   a platform; and
   a first fastener and a second fastener integrally connected with the platform by molding, bonding or threading to the platform, and the first and second fasteners respectively are received in the first and second apertures in a slip fit relationship to secure the platform to the fan hub.

2. The fan hub assembly according to claim 1, wherein the forward lug extends radially inward from the fan hub, and the aft lug extends radially outward from the fan hub.

3. The fan hub assembly according to claim 1, comprising a spinner secured to the fan hub to axially retain the platform against the forward lug.

4. The fan hub assembly according to claim 1, wherein each of the first and second fasteners is a pin.

5. The fan hub assembly according to claim 4, wherein each of the pins is integral within the platform.

6. The fan hub assembly according to claim 4, wherein each of the pins extends aftward from the platform.

7. The fan hub assembly according to claim 4, wherein the pin is bonded to the platform.

8. The fan hub assembly according to claim 1, comprising fan blades secured to the fan hub, the platform secured circumferentially between adjacent fan blades.

9. A fan hub assembly for a gas turbine engine comprising:
   a fan hub configured to rotate about an axis and including a radially extending aperture;
   a fan blade secured to the fan hub;

a platform that is separate and discrete from the fan blade and provides an inner flow surface that has a first hole and an axially extending flange is formed integrally with the platform providing an unbroken, unitary structure therewith, the axially extending flange includes a second hole; and a fastener that is a bolt aligned with the first hole and the fastener extends through the second hole, the fastener threadingly received in the aperture to secure the platform to the fan hub.

10. The fan hub assembly according to claim 9, wherein the fan hub includes an axially extending aperture receiving a second fastener securing the platform to the fan hub.

11. The fan hub assembly according to claim 10, wherein the second fastener is threaded to the platform and in a slip fit relationship with respect to the axially extending aperture.

* * * * *